UNITED STATES PATENT OFFICE.

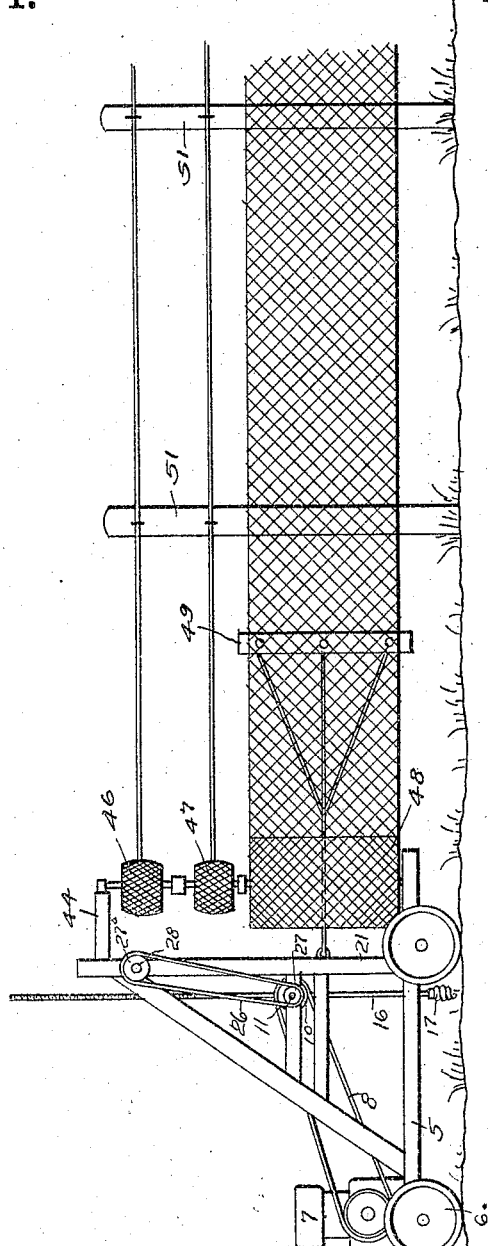

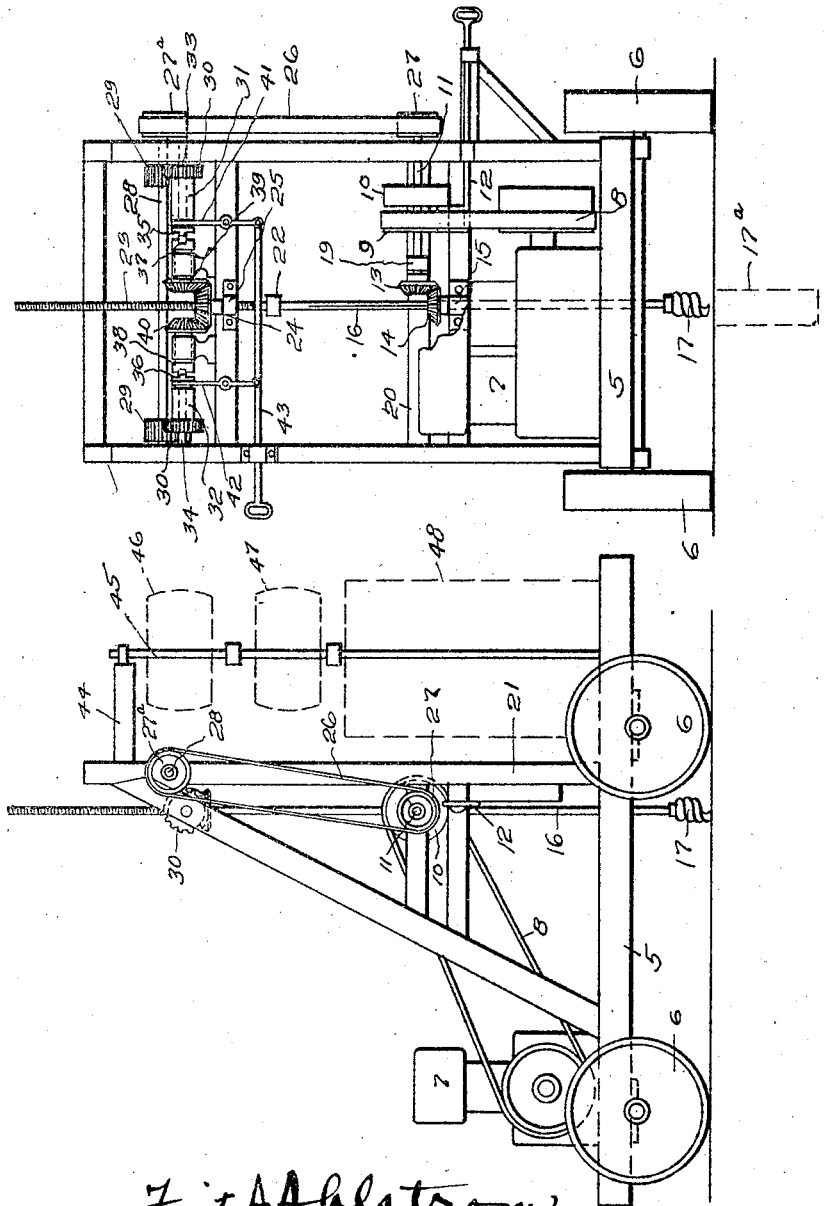

FRITZ ANTONIUS AHLSTROM, OF ABSARAKA, NORTH DAKOTA.

FENCING-MACHINE.

1,353,304.   Specification of Letters Patent.   Patented Sept. 21, 1920.

Application filed April 27, 1920. Serial No. 377,003.

*To all whom it may concern:*

Be it known that I, FRITZ ANTONIUS AHLSTROM, a citizen of the United States of America, residing at Absaraka, in the county of Cass and State of North Dakota, have invented certain new and useful Improvements in Fencing-Machines, of which the following is a specification.

This invention relates to fencing machines and it has for its object the provision of a machine which will dig post holes and stretch the wire constituting the fence across the posts and hold it in tightly stretched condition during the time that the wire is being secured to the posts.

Further objects and advantages of the invention will be set forth in the detailed description which now follows.

In the accompanying drawing—

Figure 1 is a side view illustrating the machine stretching the wire across the posts;

Fig. 2 is an enlarged side elevation of the machine; and

Fig. 3 is an end elevation thereof.

Like numerals designate corresponding parts in all of the figures of the drawing.

Referring to the drawing 5 designates a frame that is supported upon ground wheels 6. This frame carries a motor such as a gas engine 7 which through a belt 8 and fast and loose pulleys 9 and 10 drives a transverse shaft 11. A belt shifter 12 provides means for shifting the belt 8 to the loose pulley 10 so that the engine 7 may run without driving the shaft 11. The shaft 11 carries a bevel gear wheel 13 which meshes with a bevel gear wheel 14 that is mounted in a bearing 15 and is splined upon a vertical shaft 16 constituting the actuating stem of an auger 17 which serves to dig the post holes, one of which is indicated at 17ª. The inner end of the shaft 11 is journaled in a bearing 19 which is secured to a cross bar 20, the latter extending between uprights 21. The shaft 16 passes through the gearing 14 and is slidable with respect thereto. The upper end of the shaft 16 is connected by a coupling 22 with a threaded rod 23. A bevel gear wheel 24 is threaded upon the rod 23 and is held against vertical movement by a bearing 25. Consequently it will be understood that rotation of the gear wheel 24 in one direction or the other will result in bodily raising or lowering the rod 23, shaft 16 and auger 17. Rotation of the gear wheel 24 is effected from shaft 11 by means of a belt 26 which passes over a pulley 27 on the shaft 11 and over a pulley 27ª that is fast upon a shaft 28. Shaft 28 carries spur gear wheels 29 which mesh with spur gear wheels 30 which drive sleeves 31 and 32 that are slidable upon shafts 33 and 34 respectively to bring their toothed ends 35 and 36 respectively into engagement with corresponding teeth formed upon tooth collars 37 and 38 that are fast upon the shafts 33 and 34. These shafts carry bevel gear wheels 39 and 40 which mesh with the gear wheel 24. Yokes 41 and 42 are carried by a common shift lever 43 and when this lever is thrust in one direction it brings one of the sleeves into engagement with its collar to rotate the gear wheel 24 in one direction and when shifted in the other direction it brings the other of said sleeves into engagement with the corresponding toothed collar to rotate the gear wheel 24 in the other direction. Thus it will be seen that the gears 13 and 14 serve to impart positive rotation to the auger while the gears 39, 40 and 24 serve to impart a bodily vertical feeding movement to the auger. A bearing bracket 44 supports a vertical shaft 45, the latter in turn carrying rolls of wire 46, 47 and 48. The roll 48 may be woven fence wire while the rolls 46 and 47 may be single strand barbed wire. The invention is not limited to any particular number of rolls of wire it being manifest that as many rolls will be provided as may be necessary to construct the kind of fence desired. In operation the auger digs the post holes and as the machine moves ahead the posts are set and the wire stretched across the posts. The stretching is effected by securing a wire stretcher consisting of clamp 49 to the wire and leading a cable 50 to any desired part of the frame 5. Then as the frame is drawn ahead by a team, tractor or other propelling medium the wire will be tightly stretched across the posts, one of which is indicated at 51.

It is to be understood that the invention is not limited to the precise construction set forth but that it includes within its purview whatever changes fairly come within either the terms or the spirit of the appended claim.

Having described my invention, what I claim is—

A device of the character described comprising a supporting frame, a vertical shaft, an auger carried by the shaft, a threaded extension of said shaft, a gear wheel threaded upon said threaded extension, a gear wheel splined upon the shaft and held against vertical movement, a horizontal shaft, a gear wheel carried by the horizontal shaft and meshing with the gear wheel that is splined upon the vertical shaft, a second horizontal shaft, means for driving the last named horizontal shaft from first named horizontal shaft and means for driving the first named horizontal shaft from the motor, bevel gear wheels meshing with the gear wheel that is threaded upon the extension of the vertical shaft, clutch elements carried thereby, shiftable clutch sleeves co-acting with said clutch elements and gear wheels carried by said sleeves and meshing with gear wheels upon the second named horizontal shaft.

In testimony whereof I affix my signature in the presence of two witnesses.

FRITZ ANTONIUS AHLSTROM.

Witnesses:
E. H. FORD,
J. N. HOCKING.